Patented Jan. 9, 1940

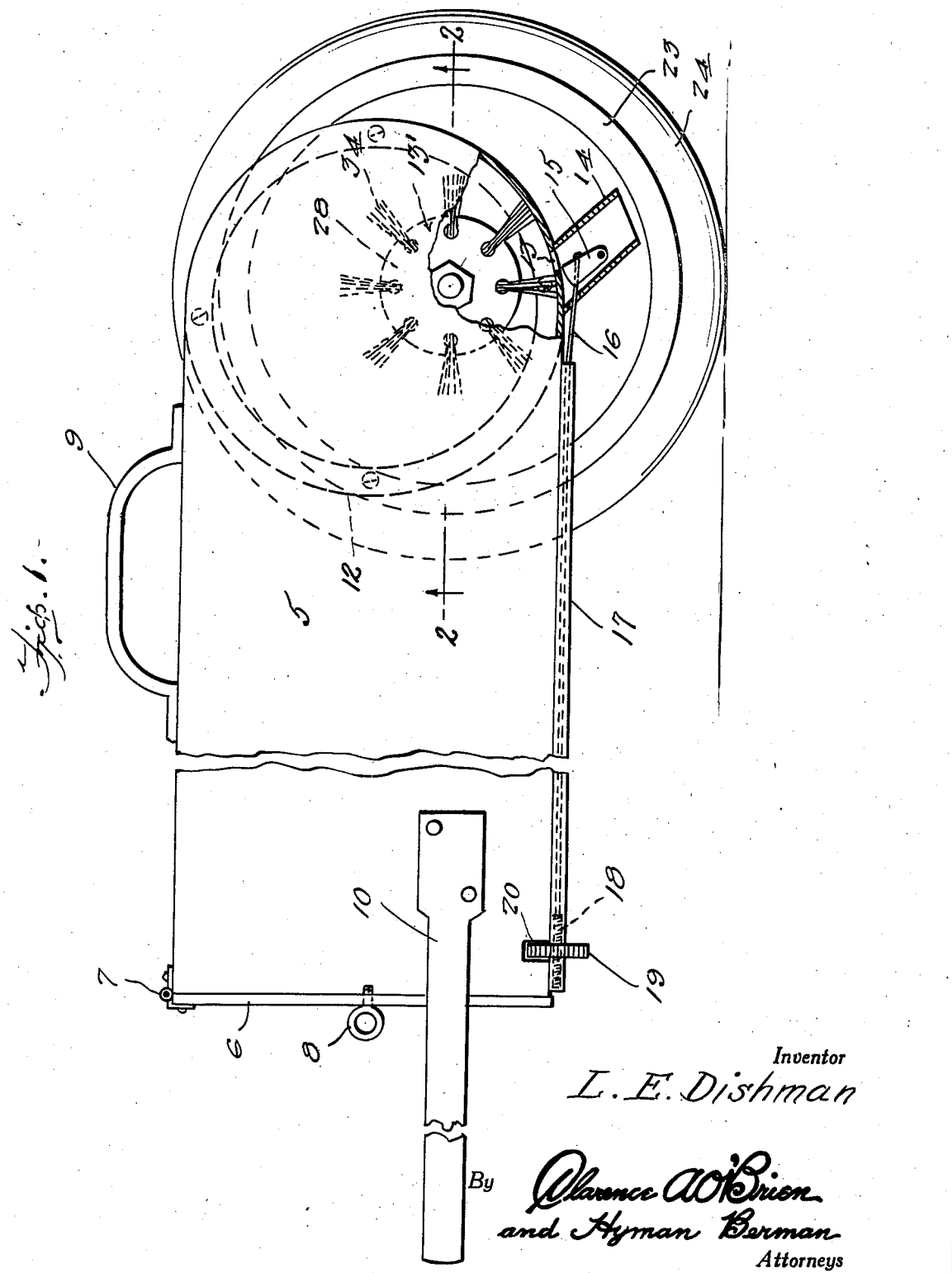

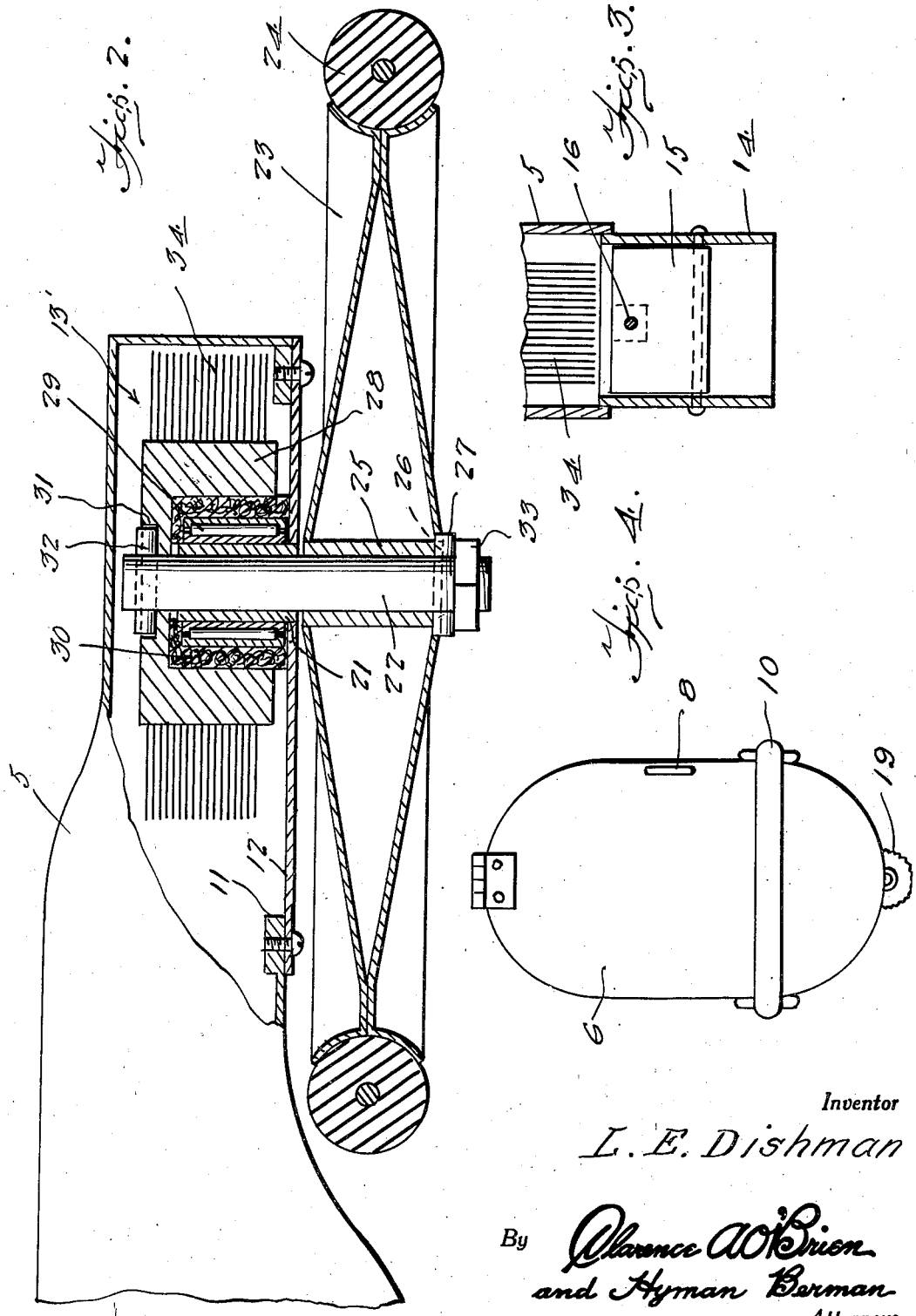

2,186,407

UNITED STATES PATENT OFFICE 2,186,407

PLAYING FIELD MARKER

Linnie E. Dishman, Tustin, Calif.

Application September 13, 1938, Serial No. 229,750

3 Claims. (Cl. 275—2)

This invention relates to markers for marking playing fields with lines of lime or similar material and has for the primary object the provision of an efficient, inexpensive and portable device of the above stated character which will discharge the marking material uniformly on the playing field and within a selected path and which will be easy to handle and guide and which includes means for varying the amount of material discharged therefrom.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a playing field marker constructed in accordance with my invention.

Figure 2 is a fragmentary longitudinal sectional view taken on the line 2—2 of Figure 1 showing the means of agitating the marking material within the hopper and its connection with the supporting wheel.

Figure 3 is a fragmentary sectional view showing a control gate or valve for the discharge spout of the device.

Figure 4 is an end view showing the door on the mouth of the hopper.

Referring in detail to the drawings, the numeral 5 indicates an elongated hopper which has one end rounded and the opposite end fully open to permit line marking material to be easily placed in the hopper and is normally closed by a door 6. The door 6 may be of the flanged type and hinged on the hopper, as shown at 7, depending on the flanges contacting the walls of the hopper to retain the door or cover in a closed position. A suitable finger piece 8 is provided on the cover or door to aid in opening and closing the latter.

A suitable handle 9 is secured on the top of the hopper for carrying the same from one place to another. A bail or handle 10 is fixed on opposite sides of the hopper adjacent the mouth so that a person can easily operate the device in making lines on a playing field.

The hopper 5 adjacent the rounded end and in one side thereof is provided with a comparatively large opening 11 normally closed by a removable plate 12. The plate 12 being removable from the hopper permits an agitator 13' to be arranged in the hopper for the purpose of keeping the marking material therein thoroughly agitated.

The lower wall of the hopper adjacent the rounded end is provided with a discharge slot 13 directly under the agitator and carried by the hopper and underlying the discharge slot 13 is a discharged spout 14 of a cross sectional shape to spread the marking material on the ground in a line of a selected width.

A gate valve 15 is pivotally mounted in the spout 14 and is movable relative to the slot 13 for controlling the flow of marking material through the spout from the discharge slot 13. An operating rod 16 is connected to the gate valve 15 and is slidably mounted in a suitable tube 17 secured on the hopper 5. The rod 16 has feed threads 18 and meshing therewith is a knurled feed nut 19. The feed nut 19 is received within a notch 20 provided in the wall of the hopper so that by rotating the feed nut in opposite directions the gate 15 may be moved relative to the discharge slot 13 for varying the amount of material flowing therethrough.

The plate 12 has formed thereon a sleeve 21 extending into the hopper and received in said sleeve is a shaft or axle 22 which extends out of the hopper by way of an opening provided in the plate 12 and which provides a mounting for the sleeve. Mounted on the axle to one side of the hopper is a ground wheel 23 having a cushion tire 24. The hub of the wheel 23 is indicated by the character 25 and is equipped with notches 26 to receive a pin 27 carried by the axle 22 so that as the wheel 23 rolls over the ground the axle 22 is rotated.

The agitator 13' includes a hub 28 chambered to receive an anti-friction bearing 29 mounted on the sleeve and to prevent the marking material from getting into the anti-friction bearing suitable packing 30 is provided. The hub of the agitator rotates about the supporting sleeve 21 with a minimum amount of friction due to the arrangement of the bearing 29 and is provided with a notch 31 to receive a pin 32 carried by the axle 22. Thus it will be seen that the agitator has a connection with the axle 22 that will bring about rotation of the agitator by the wheel 23. The end of the axle located outwardly of the hopper has threaded thereon a nut 33 to permit removal of the wheel when desired.

The hub of the agitator has a series of substantially keyhole shaped grooves or slots in its periphery to receive tufts of bristles 34. The bristles are preferably constructed of metal or wire and due to the shape of the grooves or slots can be easily removed and replaced when desired.

In operation, the hopper is filled with the marking material and the operator rolls the device over the ground by balancing the device on the wheel and the wheel rotating drives the agitator which keeps the marking material thoroughly agitated within the hopper so that it will flow evenly through the discharge slot and outwardly through the spout onto the ground in a line which provides on the ground a marking of the material.

It is believed that the foregoing description, when taken in connection with the drawings, will fully set forth the construction and advantages of this invention to those skilled in the art to which such device relates so that further detailed description will not be required.

What is claimed is:

1. A line marker comprising a hopper having an opening in one side and a discharge slot, a spout carried by the hopper and underlying the discharge slot, a removable cover plate for closing said opening, a bearing sleeve carried by said cover plate and extending into the hopper, an axle journaled in said sleeve and extending outwardly of the hopper, a ground wheel secured on said axle, an agitator journaled on the sleeve, means for connecting the agitator to said axle, and a valve means in said spout.

2. A line marker comprising a hopper, a bearing sleeve carried by said hopper and arranged therein and opening outwardly through one wall thereof, an axle journaled in said sleeve and extending out of said hopper, a ground wheel secured on said axle, an agitator including a hub journaled on the sleeve, means for connecting the hub of the agitator to said axle, said hopper having a discharge slot located directly under the agitator, a spout carried by the hopper and underlying the discharge slot, a pivotally mounted gate in the spout for controlling passing of material through the discharge slot and spout, and an operating means for said gate.

3. A line marker comprising a hopper, a bearing sleeve carried by said hopper and arranged therein and opening outwardly through one wall of said hopper, an axle journaled in said sleeve and extending out of said hopper, a ground wheel secured on said axle, a hub having a chamber to receive the sleeve, an anti-friction bearing on the sleeve within the chamber, packing means between walls of the chamber and the anti-friction bearing and one wall of the hopper, said hopper having a discharge slot located under the hub, tufts of bristles carried by said hub to coact therewith in forming an agitator, a spout carried by the hopper and underlying the discharge slot, said hub having a notch, and a pin extending through the axle and lying in the notch to establish a drive connection between said axle and the hub.

LINNIE E. DISHMAN.